(12) United States Patent
Beg

(10) Patent No.: US 10,167,706 B2
(45) Date of Patent: Jan. 1, 2019

(54) OIL/GAS PRODUCTION APPARATUS

(71) Applicant: Caltec Limited, Milton Keynes (GB)

(72) Inventor: Mirza Najam Ali Beg, Milton Keynes (GB)

(73) Assignee: CALTEC PRODUCTION SOLUTIONS LIMITED, Milton Keynes (GB)

( * ) Notice: Subject to any disclaimer, the term of this patent is extended or adjusted under 35 U.S.C. 154(b) by 244 days.

(21) Appl. No.: 15/068,108

(22) Filed: Mar. 11, 2016

(65) Prior Publication Data
US 2016/0265322 A1 Sep. 15, 2016

(30) Foreign Application Priority Data
Mar. 13, 2015 (GB) .................. 1504300.3

(51) Int. Cl.
| | | |
|---|---|---|
| *E21B 43/12* | (2006.01) | |
| *F04F 5/48* | (2006.01) | |
| *F04F 5/10* | (2006.01) | |
| *F04F 5/24* | (2006.01) | |
| *F04F 5/54* | (2006.01) | |

(Continued)

(52) U.S. Cl.
CPC .............. *E21B 43/124* (2013.01); *B01D 1/00* (2013.01); *B01D 19/0057* (2013.01); *B01D 19/0063* (2013.01); *F04F 5/10* (2013.01); *F04F 5/24* (2013.01); *F04F 5/48* (2013.01); *F04F 5/54* (2013.01)

(58) Field of Classification Search
CPC ..... F04F 5/463; F04F 5/48; F04F 5/54; E21B 43/124; E21B 43/34; B01D 19/0057; B01D 19/0063; B01D 19/0094; B01D 3/105; B01D 53/1487
See application file for complete search history.

(56) References Cited

U.S. PATENT DOCUMENTS 6,162,021 A 12/2000 Sarshar et al.
6,280,578 B1 8/2001 Popov
(Continued)

FOREIGN PATENT DOCUMENTS

EP 0 717 818 B1 5/1998
EP 1 028 811 B1 4/2002
(Continued)

OTHER PUBLICATIONS

British Search Report dated Jun. 2, 2015 for Application No. GB 1504300.3.

*Primary Examiner* — Kenneth J Hansen
(74) *Attorney, Agent, or Firm* — Fay Sharpe LLP

(57) ABSTRACT

An apparatus for boosting the pressure of flowing fluids includes jet pumps (10a, 10b), each having a low pressure (LP) inlet for LP fluid, a high pressure (HP) inlet for HP liquid and a medium pressure (MP) outlet for MP fluid. A fluid separator device (16) receives the MP fluid from the outlets of the jet pumps, and includes a gas outlet line (20) for a separated gas phase and a liquid outlet (22a, 22b) for separated liquid phase. A liquid return line (24b, 38) returns at least some of the separated liquid phase to the HP inlets of the jet pumps, and a mechanical pump (32) is connected into the liquid return line for boosting the pressure of the liquid delivered to the HP inlets of the jet pumps. A flow control system (6) is provided for controlling the flow of fluids through the respective jet pumps (10a, 10b).

23 Claims, 1 Drawing Sheet

(51) Int. Cl.
*B01D 1/00* (2006.01)
*B01D 19/00* (2006.01)

(56) References Cited

U.S. PATENT DOCUMENTS

| | | | |
|---|---|---|---|
| 2008/0017594 A1* | 1/2008 | Sarshar | B01D 17/0217 210/787 |
| 2011/0036239 A1* | 2/2011 | Sarshar | B01D 19/0057 95/259 |

FOREIGN PATENT DOCUMENTS

| | | | | |
|---|---|---|---|---|
| EP | 1 606 492 B1 | 8/2007 | | |
| GB | 2 399 864 A | 9/2004 | | |
| GB | 2 418 213 A | 3/2006 | | |
| GB | 2418213 A | * 3/2006 | | E21B 43/121 |
| GB | 2 436 580 A | 10/2007 | | |
| GB | 2 440 716 A | 2/2008 | | |
| GB | 2 450 565 A | 12/2008 | | |
| GB | 2450565 A | * 12/2008 | | E21B 43/121 |
| GB | 2521172 | 6/2015 | | |
| WO | WO 2013/124622 A1 | 8/2013 | | |
| WO | WO 2014/058778 A1 | 4/2014 | | |

* cited by examiner

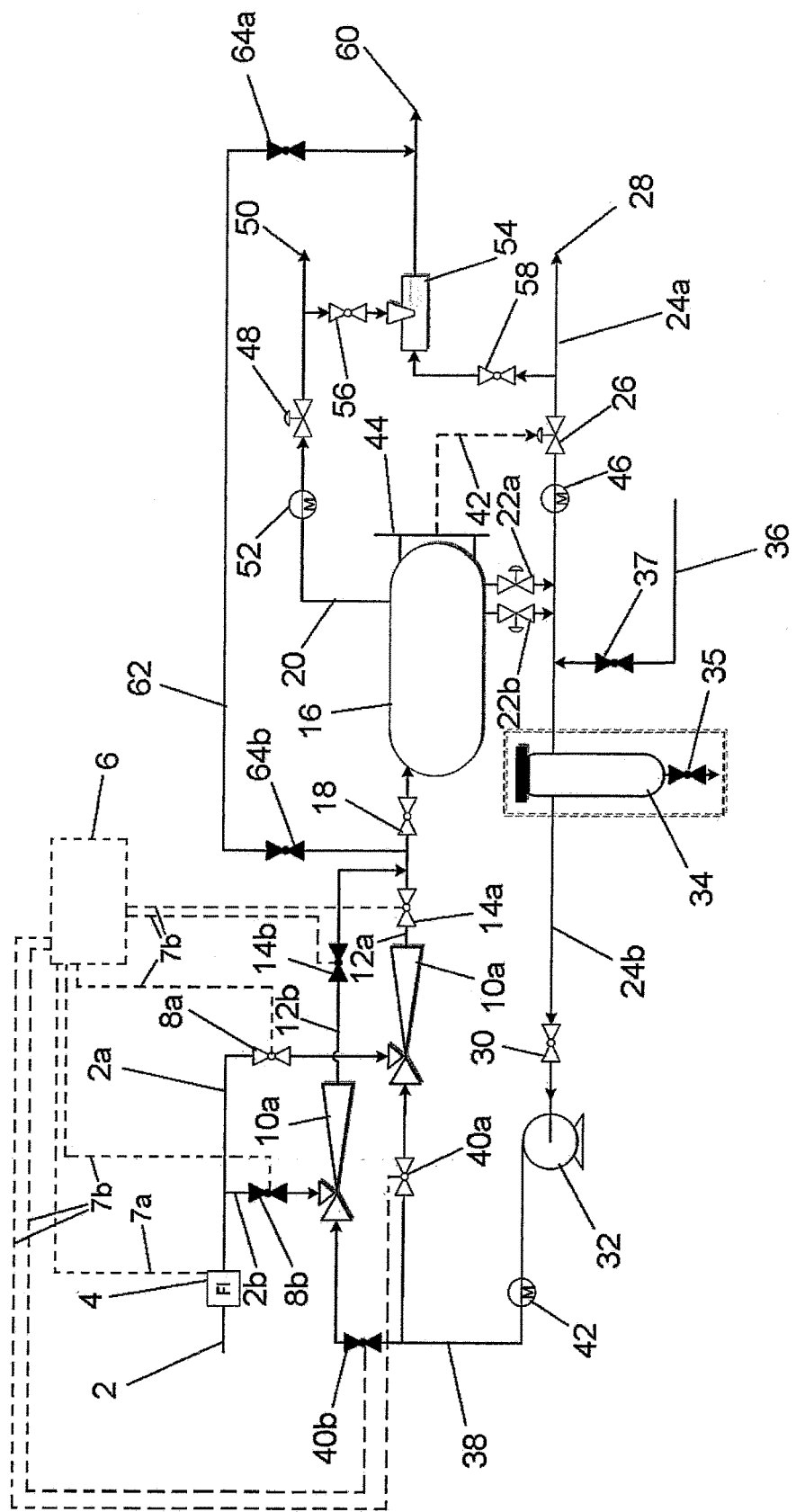

OIL/GAS PRODUCTION APPARATUS

CROSS-REFERENCE TO RELATED APPLICATION

This application claims foreign priority under 35 USC 119 to British application no. GB 1504300.3 filed Mar. 13, 2015.

FIELD

The present invention relates to an oil/gas production apparatus for boosting the production of oil and gas wells, and in particular to an apparatus for boosting the pressure of flowing fluids produced from oil and gas wells. The invention also relates to a method of increasing the pressure of flowing fluids.

BACKGROUND

In order to increase or maintain the production from oil fields with a low production well head pressure (PWHP), a boosting system may be required. Such a system allows the pressure of the extracted gases and liquids to be boosted to the pressure required by downstream processing systems or for transportation by pipeline. If the pressure of these fluids cannot be boosted efficiently, it may be uneconomic to maintain production, or in the case of the multiphase fluids, it may be necessary to flare (burn off) the low pressure gas after separating it from the liquid phase.

In some situations it is known to separate multiphase fluids and use a mechanical booster pump to boost the pressure of the liquid phase, while a gas compressor is used to boost the pressure of the gas phase. However, gas compressors are very large and expensive pieces of equipment and this solution may not be viable where space is at a premium (for example on offshore oil production platforms) or where the available resources do not justify the necessary investment.

It is also known to use jet pumps (eductors) to boost the production of oil and gas wells. Jet pumps are simple, reliable, low cost devices that use fluids from a high pressure (HP) source to boost the pressure of fluids from a low pressure (LP) source. The high pressure fluids may for example be obtained from nearby high pressure wells, or from other available sources: for example it may be possible to use high pressure gas from a gas compressor or high pressure water that is used for injection into oil or gas wells to maintain pressure. Such systems work well, provided that a suitable high pressure fluid source is available.

An example of a system for boosting pressure that uses jet pumps is described in EP0717818A. This system uses fluids from high pressure wells to boost the production of adjacent low pressure wells.

EP1606492A describes another system, in which the gas and liquid phases of a low pressure fluid are separated, and high pressure gas from any available source (e.g. from a high pressure well, a lift gas supply or a compressor) is used to boost the low pressure gas phase using a jet pump, while a mechanical pump is used to boost the pressure of the liquid phase.

There are a number of limitations associated with the use of available HP motive fluids for jet pump systems. For example, a suitable high pressure fluid supply that can be used as the motive flow in a jet pump may be unavailable, or may be of inadequate pressure or flow rate. The high pressure fluid may not be sustainable in the long term, for example if it is drawn from another well. If high pressure water is used, the downstream processing system may not have sufficient capacity to cope with the additional fluid quantity. Furthermore, the addition of a motive fluid to the fluids produced from the well will increase the total quantity of fluid flowing through the transportation pipeline, leading to an increased pressure loss along the pipeline and thereby diminishing or negating the benefits gained by using a pressure boosting system.

GB2450565 describes a pressure boosting system that addresses some of these limitations. In this system a jet pump is used to boost the pressure of the LP fluid. The LP fluid may be either a multiphase fluid or a predominantly gas phase fluid, and the jet pump is driven by a HP liquid phase fluid that is supplied by a booster pump. The jet pump combines these fluids and the output of the jet pump therefore comprises a medium pressure multiphase fluid. This output fluid is delivered to a separator, which separates the gas phase from the liquid phase. Part of the liquid phase is then returned to the booster pump and used to drive the jet pump, while the remaining part of the liquid phase is recombined with the gas phase leaving the separator and then delivered to downstream processing systems. The system is self-sustaining, requiring no external supply of HP fluid to drive the jet pump.

One limitation of the system described in GB2450565 is that it cannot always cope well with large variations in the composition of the LP fluid drawn from the LP well. Such variations may occur for example when re-starting a well from which flow has ceased. When flow from such a well is re-started the flow may initially consist almost entirely of gas, later changing to a multiphase fluid with an increasing proportion of liquid as the flow increases and the well is brought back into production. In this situation it may be difficult to select a jet pump that operates efficiently under the changing flow regime.

Another problem can be encountered if the fluid drawn from the LP well contains a significant amount of sand. The sand tends to stay entrained within the liquid phase that is drawn from the separator and then returned to the booster pump and used to drive the jet pump. Any sand carried by the liquid phase will therefore pass through the booster pump and the jet pump. This can cause severe wear within those parts of the system, eventually requiring their replacement.

SUMMARY

It is an object of the present invention to provide a pressure boosting system that mitigates at least some of the aforesaid disadvantages. Another preferred object of the invention is to provide a pressure boosting system for use in oil and gas production that reduces the back pressure on low pressure wells and delivers the produced gas and liquid phases at a higher pressure, as dictated by downstream processing and production requirements, and that has an improved ability to handle changing flow regimes in the produced fluid.

According to one aspect of the present invention there is provided an oil/gas production apparatus for boosting the pressure of flowing fluids produced from oil and gas wells, the apparatus including a LP inlet line for receiving a LP fluid, a plurality of jet pumps, each jet pump having a LP inlet port connected to the LP inlet line to receive the LP fluid, a HP inlet port for receiving a HP liquid and a MP outlet port for MP multiphase fluid, a fluid separator device for separating the MP multiphase fluid in to a gas phase and a liquid phase, the fluid separator device having an inlet connected to receive the MP multiphase fluid from the MP outlet ports of the jet pumps, a gas outlet for the separated gas phase and a liquid outlet for the separated liquid phase, a liquid return line connected to the liquid outlet and to the HP inlet ports of the jet pumps for returning at least some of the separated liquid phase to the HP inlets of the jet pumps, a mechanical pump connected into the liquid return line for boosting the pressure of the separated liquid phase to a high pressure and delivering the resulting HP liquid to the HP inlets of the jet pumps, and a flow control system for controlling the flow of fluids through the respective jet pumps.

The terms "low pressure", "medium pressure" and "high pressure" are all used in a relative sense and are not intended to indicate absolute pressure values. A "low pressure" is therefore lower than a "medium pressure", which is lower than a "high pressure". The term "fluid" encompasses liquid, gas and multiphase fluids (mixtures of gas and liquid). Multiphase fluids may also contain some entrained solids, for example sand. The liquids may include oil, water or mixtures thereof.

The oil/gas production apparatus makes it possible to boost or maintain production from oil and gas wells. It can be used to increase the pressure of the produced fluids to the pressure required by downstream processing systems or for transportation by pipeline. It is therefore possible to make use of low pressure produced gas rather than flaring it. It does not need a complex and expensive gas compressor and unlike previous jet pump systems it does not require an external source of high pressure fluid (e.g. lift gas, fluids from HP wells or HP water) to drive the jet pump. Furthermore, as no extra fluids are added to the produced fluids, it does not increase in the flow rate through the delivery pipeline and does not cause an increase in the pressure differential along the pipeline. There is also no additional burden on downstream processing systems. The production boosting apparatus is cost effective and efficient, and has a relatively low energy demand. It is also simple and reliable and has low maintenance requirements.

In addition, the use of a plurality of jet pumps and a flow control system that controls the flow of fluids through the jet pumps allows the oil/gas production apparatus to adapt to changing flow regimes in the LP fluid, for example when re-starting production from a well from which flow has ceased. When flow from such a well is re-started the flow may initially consist almost entirely of gas, later changing to a multiphase fluid with an increasing proportion of liquid as the flow increases and the well is brought back into production. In this situation the flow control system may operate to direct flow to a first jet pump that is configured for pumping gas during the first stage of the re-starting process, and may switch the flow to a second jet pump that is configured for pumping multiphase fluid when the amount of liquid in the produced fluid reaches a predetermined level. This ensures efficient operation. The jet pumps may also be used singly or in combination, to ensure efficient operation if the pressure or flow rate of the produced fluid changes.

The oil/gas production apparatus may also be used for other applications, for example for boosting production from a LP well that is already in production, boosting production from a LP well that is backed-out (not flowing), deliquifying a liquid-loaded gas well to increase production, capturing gas that would otherwise be flared to atmosphere or via a flare stack, and cleaning a well by removing debris from the wellhead without the use of a mechanical pump. The use of a plurality of jet pumps also provides flexibility to create different levels of backpressure reduction.

Advantageously, the flow control system includes one or more flow control valves configured to control the flow of fluids through one or more of the inlet and outlet ports of the jet pumps. The flow control valves may be configured to control the flow of fluids through the HP or LP inlet ports of the jet pump, or the MP outlet port, or a combination of the inlet and outlet ports. The flow control valves may be operated automatically.

Advantageously, the flow control system includes a sensor device that senses at least one parameter of the LP fluid in the LP inlet line. The sensor device may for example be configured to sense the flow regime of the LP fluid (i.e. the relative proportions of gas and liquid in the LP fluid), or the flow rate or pressure of the LP fluid, or a combination of these and other parameters.

Advantageously, the flow control system includes a control device that operates automatically to control the flow of fluids through the respective jet according to the sensed parameter. The control device may for example include a data processing unit that is connected to receive a signal from the sensor device and determines from the sensed signal a distribution of fluid flows through the jet pumps that provides for efficient operation of the production apparatus, and which then sends control signals to the flow control valves to achieve the determined distribution of fluid flows.

Advantageously, the control system is configured to bring a first jet pump into operation when the LP fluid received in the LP inlet line contains a relatively low proportion of liquid (for example when the LP fluid consists entirely of gas or is a multiphase fluid that contains a relatively high proportion of gas), and is configured to bring a second jet pump into operation when the LP fluid received in the LP inlet line contains a relatively high proportion of liquid (for example when the LP fluid consists entirely of liquid or is a multiphase fluid that contains a relatively low proportion of gas).

Advantageously, the first jet pump is configured for efficient operation when the LP fluid received in the LP inlet port contains a relatively low proportion of liquid, and the second jet pump is configured for efficient operation when the LP fluid received in the LP inlet port contains a relatively high proportion of liquid.

Advantageously, the apparatus includes a level sensor that senses a liquid level in the fluid separator device, and a liquid control valve that controls a flow of the separated liquid phase into a liquid outlet line, wherein operation of the liquid control valve is controlled according to the sensed liquid level to maintain a constant liquid level in the fluid separator device.

Advantageously, the apparatus includes a pressure sensor that senses a gas pressure in the fluid separator device, and a gas control valve that controls a flow of the separated gas phase into a gas outlet line, wherein operation of the gas control valve is controlled according to the sensed gas pressure to maintain a constant gas pressure within the fluid separator device.

Advantageously, the apparatus includes a comingling device having a gas inlet connected to receive the separated gas phase, a liquid inlet connected to receive the separated liquid phase, and an outlet line for a combined multiphase fluid.

Advantageously, the apparatus includes a sand/solids catcher device in the liquid return line, for capturing sand/solids in the returned liquid. This helps to resolve the problem can be encountered if the fluid drawn from the LP well contains a significant amount of sand. Any sand entrained within the liquid phase that is drawn from the separator passes through the sand/solids catcher device, which removes the sand/solids before the separated liquid phase is returned to the booster pump and used to drive the jet pump. This avoids the severe wear that can be encountered if the liquid contains sand/solids.

Advantageously, the apparatus includes a by-pass line connected to the MP outlets of the jet pumps and to a fluid outlet, for delivering MP fluid from the MP outlets of the jet pumps to the fluid outlet without passing through the fluid separator device. This may be used when the production apparatus is used in well cleaning mode, to divert water used to flush out the well to a separate output without contaminating the fluid separator device.

Advantageously, the apparatus includes a liquid feed line for feeding liquid into the liquid return line. This may be used either for topping up the liquid phase in the fluid separator device, or for injecting water into the system during a well cleaning operation.

Advantageously, the fluid separator device includes a cyclonic separator followed by a separation vessel in which the gas and liquid phases are separated by gravity. The fluid separator device may for example be of the type known by the proprietary term Caltec Wx, which includes a uniaxial cyclonic separator mounted within a horizontal separation tank. A separator of this type is described in WO2013/124622. Alternatively, a cyclonic separator may be used on its own. The cyclonic separator may be a compact cyclonic separator, for example a uniaxial cyclonic separator of the type sold under the proprietary terms I-SEP and HI-SEP, some examples of which are described in EP1028811B1 and GB2440716A. It is also possible to use a conventional knock-out vessel.

According to another aspect of the present invention there is provided a method of producing oil/gas from oil and gas wells, the method including providing a plurality of jet pumps, each jet pump having a LP inlet port, a HP inlet port and a MP outlet port, providing a fluid separator device having an inlet, a gas outlet and a liquid outlet, delivering a LP fluid to the LP inlet of at least one of the jet pumps, delivering a HP liquid to the HP inlet of at least one of the jet pumps, combining the LP fluid with the HP liquid in the jet pump to form MP fluid, delivering the MP fluid to the fluid separator device, separating the MP fluid in the fluid separator to form a gas phase and a liquid phase, boosting the pressure of at least some of the separated liquid phase with a mechanical pump to form a HP liquid, returning the HP liquid to the HP inlet of the jet pump, and controlling the flow of fluids through the respective jet pumps with a flow control system.

Advantageously, the method includes sensing at least one parameter of the LP fluid in the LP inlet line.

Advantageously, the method includes automatically controlling the flow of fluid through the respective jet according to the sensed parameter.

Advantageously, the method includes controlling the flow of fluid through the jet pumps so that the jet pumps operate together or separately, according to the flow regime of the LP fluid.

Advantageously, the method includes bringing a first jet pump into operation when the LP multiphase fluid received in the LP inlet line contains a relatively low proportion of liquid, and bringing a second jet pump into operation when the LP multiphase fluid received in the LP inlet line contains a relatively high proportion of liquid.

Advantageously, the method includes capturing sand/solids in the returned liquid.

Advantageously, the method includes delivering HP fluid from the HP outlets of the jet pumps to the fluid outlet without passing through the Fluid separator device.

Advantageously, the method includes feeding liquid into the liquid return line.

Advantageously, the method includes sensing the level of the liquid phase in the fluid separator device, and controlling the flow of the separated liquid phase into a liquid outlet line according to the sensed liquid level.

Advantageously, the method includes sensing the pressure of the separated gas phase at the gas outlet of the fluid separator device, and controlling the flow of the separated gas phase into a gas outlet line according to the sensed gas pressure.

Advantageously, the method includes comingling the separated gas phase with at least some of the separated liquid phase, and delivering a combined multiphase fluid to a multiphase outlet.

Advantageously, the method includes separating the gas and liquid phases by cyclonic action followed by gravitational separation in which the gas and liquid phases are separated by gravity.

BRIEF DESCRIPTION OF THE DRAWING

An embodiment of the invention will now be described by way of example with reference to the accompanying drawing, in which:

FIG. 1 is a schematic diagram illustrating a pressure boosting system according to an embodiment of the invention.

DETAILED DESCRIPTION

The system shown in FIG. 1 includes a low pressure (LP) inlet line 2 for LP multiphase fluids (gases and liquids). A flow indicator 4 is fitted into the inlet line 2 to detect the phase of the fluid flowing through the inlet line. The flow indicator 4 provides an output signal to a control device 6 via signal line 7a. The control device 6 and the signal line 7a may be parts of an automatic control system that controls operation of the pressure boosting system via control lines 7b. Alternatively, the control device 6 may include an indicator device that provides an indication of the phase of the fluid flowing through the inlet line 2 and enables an operator to make manual adjustments to control operation of the pressure boosting system.

Downstream of the flow indicator 4 the inlet line 2 splits into two (or more) branches 2a, 2b, each containing a respective flow control valve 8a, 8b. The flow control valves 8a, 8b may optionally be configured to be controlled automatically by the control device 6. Downstream of the respective flow control valve 8a, 8b each branch 2a, 2b of the inlet line is connected to the LP inlet of a respective jet pump 10a, 10b. The first and second jet pumps 10a, 10b may be identical or (preferably) they may be configured to operate with different flow regimes (i.e. different relative proportions of gas phase and liquid phase fluids) at their respective LP fluid inlets and/or at different pressures or fluid flow rates. For example, the first jet pump 10a may be configured for efficient operation at well start-up when the produced fluid delivered to the LP jet pump inlet consists primarily of gas phase fluid, and the second jet pump 10b may be configured for efficient operation during the production of multiphase or liquid phase fluid, when it serves to boost the pressure of the produced fluid.

The respective outlet of each jet pump 10a, 10b is connected via a transfer line 12a, 12b and a flow control valve 14a, 14b to the inlet of a MP fluid separator 16. A master flow control valve 18 is provided upstream of the inlet to the separator 16. In this embodiment the fluid separator 16 comprises a horizontal separator, for example of the type known by the proprietary term Caltec Wx, which includes a uniaxial cyclonic separator mounted within a horizontal separation tank. A separator of this type is described in our earlier patent application WO2013/124622, the contents of this which are incorporated by reference herein.

The MP fluid separator 16 may alternatively be a conventional knock out vessel, comprising a cylindrical vessel with a vertical axis, having a tangential inlet, a gas outlet port at its upper end and a liquid outlet port at its lower end. Alternatively, the MP fluid separator 16 may consist of a compact cyclonic separator, for example a uniaxial cyclonic separator of the type sold under the proprietary terms I-SEP and HI-SEP, some examples of which are described in our earlier patents and patent applications EP1028811B1 and GB2440716A. The contents of these earlier patents and patent applications are incorporated by reference herein.

The MP fluid separator 16 has a gas outlet port that is connected to a MP gas outlet line 20 and one or more liquid outlet ports that are connected via flow control valves 22a, 22b to the MP liquid line 24. The flow of liquid into the MP liquid line 24 is divided, part of the MP liquid flowing through a MP liquid outlet line 24a and flow control valve 26 towards a liquid outlet 28, and part of the MP liquid flowing through a MP liquid return line 24b and a flow control valve 30 towards a mechanical liquid booster pump 28. A conventional sand/solids catcher device 34 may optionally be provided in the MP liquid return line 24b upstream of the pump 32, to catch any sand or solid particles entrained in the MP liquid flow. The sand/solids caught by the sand/solids catcher device 34 may be drained as required through an outlet vent 35.

An optional liquid feed line 36 may also be provided, which is connected to the MP liquid return line 24b through a flow control valve 37. This liquid feed line 36 may be used to top up or supplement the amount of liquid in the system when necessary, to ensure that it contains a sufficient quantity of liquid to drive the jet pumps 10a, 10b.

The outlet of the liquid pump 32 is connected via HP liquid lines 38, 38a, 38b and respective flow control valves 40a, 40b to the HP inlets of the jet pumps 10a, 10b. A flow meter 42 is provided in the HP liquid line 38. The pump 32 is thus able to deliver HP fluid to the HP inlets of the jet pumps 10a, 10b in order to drive the jet pumps. The delivery of HP fluid to the jet pumps 10a, 10b is controlled by the flow control valves 40a, 40b, which may optionally be connected to and controlled by the control device 6. The control valves 40a, 40b may be operated so that either or both of the jet pumps are operated as required, according to operating parameters including the flow regime of the produced fluids, the flow rate and pressure of the produced fluids and downstream process requirements and conditions.

The flow of liquid into the MP liquid outlet line 24a may be controlled by the flow control valve 26, which receives a control signal via control line 42 from a liquid level detector 44 attached to the separator vessel 16. The flow control valve 26 and the liquid level detector 44 operate in tandem to control the flow of liquid towards the outlet 28 in order to maintain a constant liquid level within the separator 16.

Optionally, a flow meter 46 may be provided in the MP liquid outlet line 24a to measure the flow of liquid through the line.

The MP gas flowing through the gas outlet port of the separator 16 passes through the MP gas outlet line 20 and a flow control valve 48 towards a gas outlet 50. Optionally, a flow meter 52 may be provided in the MP gas outlet line 20 to measure the flow of gas through the line.

Alternatively, instead of delivering the MP gas and the MP liquid to the separate outlets 28, 50, the MP gas and the MP liquid may be combined in a commingler device 54, for example of the type described in our earlier patents and patent applications EP0717818B and GB1321916.7, the contents of which are incorporated by reference herein. The flow of gas and liquid streams to the commingler device 54 is controlled by respective flow control valves 56, 58 and the combined MP multiphase fluid is delivered from the commingler device 54 to a multiphase outlet 60.

The system also includes an optional by-pass line 62 and flow control valves 64a, 64b, through which fluid from the outlets of the jet pumps 10a, 10b can be diverted to the multiphase outlet 60 without passing through the separator 16. The bypass line 62 may be used for example in a well cleaning operation in which water is injected into the well to flush out accumulated debris. The bypass line 62 is used to divert the output fluids of the jet pumps 10a, 10b to a downstream cleaning system, without passing through the fluid separator 16. If required, additional water to drive the jet pumps 10a, 10b during the well cleaning operation may be supplied to the liquid pump 32 through the liquid feed line 36.

In use, the LP multiphase fluid flowing through the inlet line 2 is fed through one or both of the flow control valves 8a, 8b into the respective low pressure inlet of the jet pumps 10a, 10b. The selection of which jet pump or jet pumps to operate is determined by operating factors including, for example, the flow regime of the produced fluid (i.e. the relative proportions of the gas and liquid phases in the produced fluid), the flow rate and pressure, downstream operating requirements and so on. The operative jet pump 10a, 10b is driven by high pressure liquid from the liquid pump 32, which serves as the motive flow for the jet pump. The jet pump 10a, 10b combines the LP multiphase fluid with the HP liquid and increases the pressure of the combined multiphase fluid to a medium pressure (MP) that is below the pressure of the HP liquid driving the jet pump, but higher than the original pressure of the LP multiphase fluid flowing through the inlet line 2.

The combined MP multiphase fluid flowing from the jet pump 10a, 10b is introduced into the MP fluid separator 16, where the gas and liquid phases separate under cyclonic action and/or gravity. A body of liquid collects in the lower part of the separation vessel, while the gas rises into the upper part of the vessel. The MP liquid then exits through the liquid outlet valves 22a, 22b while the MP gas exits through the gas outlet line 20.

The liquid outlet valves 22a, 22b feed the MP liquid into the liquid outlet line 24a and the liquid return line 24b, the flow of MP liquid into each of these lines being controlled by the liquid outlet valves 22a, 26 and the liquid return valves 22b, 30 respectively. A cooler (not shown) may optionally be provided in the liquid return line 24b for cooling the MP liquid, should this be necessary.

The pressure of the MP liquid flowing through the liquid return line 24b may if required be reduced by the liquid return valve 30, and is then fed to the inlet of the mechanical booster pump 32, which increases the pressure of the liquid and delivers it to the high pressure inlets of one or both of the jet pumps 10a, 10b, as described above. The booster pump 32 may have a variable speed feature to assist with start-up and to provide a build-up in the liquid flow entering the jet pump.

The flow of MP liquid through the liquid outlet line 24a is controlled by the liquid outlet valve 26. Operation of the liquid outlet valve 26 is controlled by the level-sensing device 44 attached to the MP fluid separator vessel 16, which is designed to maintain a constant liquid level in the vessel.

The MP gas flowing through the gas outlet port of the separator 16 enters the gas outlet line 20. The rate of flow through the gas outlet line 20 is controlled by the gas outlet valve 48, operation of the gas outlet valve 48 optionally being controlled by a pressure transducer 52, which is connected to the gas outlet line 20 and arranged to maintain a constant pressure in the Fluid separator 16.

The MP gas flowing through the gas outlet line 20 and the MP liquid flowing through the liquid outlet line 24a may leave the system separately through those two outlet lines. Alternatively, both MP fluids may be fed to the comingling device 54 through respective control valves 56, 58. The MP fluids are combined in the comingling device 54 and the resulting combined MP multiphase fluid then leaves the system through a MP multiphase outlet 60.

Because the liquid phase is recycled continuously via the MP fluid separator 16 and the liquid return line 24b, the total amount of liquid fed to the HP inlets of the jet pumps 10a, 10b may be several times the amount of liquid phase contained within the multiphase fluid flowing into the system through inlet line 2 from the LP wells. The total flow rate of the liquid phase fed to the jet pump as the motive flow can typically range between three and five times the flow rate of the liquid phase from the LP wells linked to the system, although this is not a limit for the system. The quantity of liquid that is available for use as the motive flow is therefore substantially increased as compared to a system in which the jet pump is driven only by fluid entering system. This allows the jet pumps to boost the pressure of the gas and liquid phases, rather than just the liquid phase. The jet pumps can operate efficiently to increase the pressure of the gas phase, allowing it to be transported or processed rather than simply flared off, even if the proportion of gas within the LP multiphase fluid entering the system is relatively high.

The operation of the system and its key components is controlled by the following control components:
  the flow regime of the LP multiphase fluid in the inlet line 2, which is detected by the flow indicator 4,
  the operating pressure of the separator 16, which is controlled by the pressure transducer 52 and the control valve 48,
  the liquid level of the separator 16, which is controlled by the level detection system 44 and the control valve 26,
  the flow rate of liquid re-circulated through liquid return line 24b, which is controlled by the pressure transducer 42 and the control valve 30.

The build-up of re-circulated liquid flowing through liquid return line 24b is achieved gradually at start-up under a semi-manual procedure and continues until the pressure at the HP inlets to the jet pumps 10a, 10b reads the required operating value. The characteristics of the jet pumps 10a, 10b are such that when the pressure at the outlet of the mechanical booster pump 32 reaches a specified value then the desired total HP liquid flow rate needed by the jet pump is reached.

Under certain circumstances, the re-circulation of liquid through the pumping system may result in the heating of the liquid phase. For this reason a cooler system (not shown) may optionally be installed on liquid return line to maintain the temperature at a desired value.

The boosted MP gas and liquid phases in outlet lines 20, 24a may flow independently along the two lines. Alternatively, in applications when there is only one line available for transport or export of the produced fluids the boosted gas and liquid phases can be combined through the comingling device 54 and the mixture will then flow through the single multiphase outlet line 60.

The system enables the back pressure on LP wells to be reduced, thus increasing their production. The boosting system boosts the pressure of the produced fluids to that required by the downstream production system or for export through lines 28, 50, 60.

The drop in the back pressure (dP) on the LP wells may be only a few bar (typically 2 to 5 bar) or may be higher if required. The delivery pressure of the booster pump 32 is dictated by the amount of LP fluid to be handled by the jet pumps 10a, 10b and the dP or level of pressure boost required to be achieved by the jet pumps.

As the HP liquid phase is the motive flow that boosts the pressure of the LP multiphase fluid, the volumetric flow rate of the LP gas phase could be in the order of two to ten times the volumetric flow rate of the HP liquid phase at the operating pressure and temperature. These ratios are not the limit of the system and are quoted only as typical values.

The values set out above depend on the desired ratio of the delivery pressure to the inlet gas pressure. Use of the system is particularly attractive when the gas/oil ratio (GOR) of the LP inlet fluid is relatively low. The GOR is normally defined as standard cubic feet of gas per barrel of oil produced (Scf/bbl) and typical values for low GOR are below 600 Scf/bbl, although this not a limit for the system. Naturally, the lower the GOR, the lower will be both the amount of the motive liquid required for the jet pumps 10a, 10b and also the power rating of the liquid booster pump 32.

A major benefit of this system is the elimination of any need to flare the LP gas, or use a compressor to boost the pressure of the LP gas. It is worth noting that if a compressor were used for boosting the pressure of the LP gas, a bulky knock-out vessel would then be needed to remove excess mist in the separated gas and ensure that the compressor receives gas free of any contaminant liquid droplets. The need for the knock-out vessel, the cost of the compressor and the maintenance requirements of the compressor make the use of a compressor far less attractive, compared the system described herein involving the use of a jet pump, which is of much lower cost and is simple to operate.

The invention claimed is:

1. An oil and gas production apparatus for boosting pressure of flowing fluids produced from oil and gas wells, the apparatus comprising:
  a low pressure (LP) inlet line for receiving a LP fluid,
  a plurality of jet pumps, each jet pump including a LP inlet port connected to the LP inlet line to receive the LP fluid, a high pressure (HP) inlet port for receiving a HP liquid and a medium pressure (MP) outlet port for MP multiphase fluid,
  a fluid separator device for separating the MP multiphase fluid into a gas phase and a liquid phase, the fluid separator device comprising an inlet connected to receive the MP multiphase fluid from the MP outlet ports of the jet pumps, a gas outlet for the separated gas phase and a liquid outlet for the separated liquid phase, a liquid return line connected to the liquid outlet and to the HP inlet ports of the jet pumps for returning at least some of the separated liquid phase to the HP inlet ports of the jet pumps, a mechanical pump connected into the liquid return line for boosting the pressure of the separated liquid phase to a high pressure and delivering the resulting HP liquid to the HP inlet ports of the jet pumps, a flow control system for controlling flow of fluids through the respective jet pumps, and a by-pass line connected to the MP outlet ports of the jet pumps and to a fluid outlet for delivering MP fluid from the MP outlet ports of the jet pumps to the fluid outlet without passing through the fluid separator device.

2. An apparatus according to claim 1, wherein the flow control system includes one or more valves configured to control the flow of fluids through one or more of the inlet and outlet ports of the jet pumps.

3. An apparatus according to claim 1, wherein the flow control system includes a sensor device that senses at least one parameter of the LP fluid in the LP inlet line.

4. An apparatus according to claim 3, wherein the flow control system includes a control device that operates automatically to control the flow of fluids through the plurality of jet pumps according to the sensed parameter.

5. An apparatus according to claim 4, wherein the control system is configured to bring a first jet pump of the plurality of jet pumps into operation when the LP fluid received in the LP inlet line contains a lower proportion of liquid content relative to gas content, and is configured to bring a second jet pump of the plurality of jet pumps into operation when the LP fluid received in the LP inlet line contains a higher proportion of liquid content relative to gas content.

6. An apparatus according to claim 5, wherein the first jet pump is configured for operation when the LP fluid received in the LP inlet port contains a lower proportion of liquid content relative to gas content, and the second jet pump is configured for operation when the LP fluid received in the LP inlet port contains a higher proportion of liquid content relative to gas content.

7. An apparatus according to claim 1, further comprising a level sensor that senses a liquid level in the fluid separator device, and a liquid control valve that controls a flow of the separated liquid phase into a liquid outlet line, wherein operation of the liquid control valve is controlled according to the sensed liquid level to maintain a constant liquid level in the fluid separator device.

8. An apparatus according to claim 1, further comprising a pressure sensor that senses a gas pressure in the fluid separator device, and a gas control valve that controls a flow of the separated gas phase into a gas outlet line, wherein operation of the gas control valve is controlled according to the sensed gas pressure to maintain a constant gas pressure within the fluid separator device.

9. An apparatus according to claim 1, further comprising a comingling device having a gas inlet connected to receive the separated gas phase, a liquid inlet connected to receive the separated liquid phase, and an outlet line for a combined multiphase fluid.

10. An apparatus according to claim 1, further comprising a sand/solids catcher device in the liquid return line, for capturing sand/solids in the returned liquid.

11. An apparatus according to claim 1, further comprising a liquid feed line for feeding liquid into the liquid return line.

12. An apparatus according to claim 1, wherein the fluid separator device includes a cyclonic separator followed by a separation vessel in which the gas and liquid phases are separated by gravity.

13. A method of producing oil and gas from oil and gas wells, the method comprising:
providing a plurality of jet pumps, each jet pump having a low pressure (LP) inlet port, a high pressure (HP) inlet port and a medium pressure (MP) outlet port,
providing a fluid separator device having an inlet, a gas outlet and a liquid outlet,
delivering a LP fluid to the LP inlet port of at least one of the plurality of jet pumps through an LP inlet line,
delivering a HP liquid to the HP inlet port of the at least one of the plurality of jet pumps,
combining the LP fluid with the HP liquid in the at least one of the plurality of jet pumps to form MP fluid,
delivering the MP fluid to the fluid separator device,
separating the MP fluid in the fluid separator device to form a gas phase and a liquid phase,
boosting the pressure of at least some of the separated liquid phase with a mechanical pump to form a HP liquid,
returning the HP liquid to the HP inlet port of the at least one of the plurality of jet pumps through a liquid return line,
controlling the flow of fluids through the plurality of jet pumps with a flow control system, and
delivering MP fluid from the MP outlet port of the at least one of the plurality of jet pumps to a fluid outlet without passing through the fluid separator device.

14. A method according to claim 13, further comprising sensing at least one parameter of the LP fluid in the LP inlet line.

15. A method according to claim 14, further comprising automatically controlling the flow of fluid through the plurality of jet pumps according to the sensed parameter.

16. A method according to claim 15, further comprising controlling the flow of fluid through the plurality of jet pumps so that the jet pumps operate together or separately.

17. A method according to claim 16, further comprising bringing a first jet pump of the plurality of jet pumps into operation when the LP multiphase fluid received in the LP inlet line contains a lower proportion of liquid content relative to gas content, and bringing a second jet pump of the plurality of jet pumps into operation when the LP multiphase fluid received in the LP inlet line contains a higher proportion of liquid content to gas content.

18. A method according to claim 13, further comprising capturing sand/solids in the HP liquid returned to the HP inlet port.

19. A method according to claim 13, further comprising feeding liquid into the liquid return line.

20. A method according to claim 13, further comprising sensing a level of the liquid phase in the fluid separator device, and controlling flow of the separated liquid phase into a liquid outlet line according to the sensed liquid level.

21. A method according to claim 13, further comprising sensing a gas pressure of the separated gas phase at the gas outlet of the fluid separator device, and controlling flow of the separated gas phase into a gas outlet line according to the sensed gas pressure.

22. A method according to claim 13, further comprising comingling the separated gas phase with at least some of the separated liquid phase, and delivering a combined multi-phase fluid to a multiphase outlet.

23. A method according to claim 13, further comprising separating the gas and liquid phases by cyclonic action followed by gravitational separation in which the gas and liquid phases are separated by gravity.

\* \* \* \* \*